United States Patent [19]
Wallace et al.

[11] Patent Number: 4,928,496
[45] Date of Patent: May 29, 1990

[54] HYDROGEN HEAT PUMP

[75] Inventors: W. Edward Wallace; H. Kevin Smith; W. Bryan Lynch; Raymond S. Craig, all of Pittsburgh; Fiaz Pourarian, Verona, all of Pa.

[73] Assignee: Advanced Materials Corporation, Pittsburgh, Pa.

[21] Appl. No.: 337,960

[22] Filed: Apr. 14, 1989

[51] Int. Cl.⁵ ............................................. F17C 11/00
[52] U.S. Cl. ..................................... 62/46.2; 62/467; 165/104.12
[58] Field of Search ...................... 62/46.2, 467; 165/104.12

[56] References Cited

U.S. PATENT DOCUMENTS

| | | | |
|---|---|---|---|
| Re. 30,840 | 11/1977 | Terry | 62/2 |
| 3,375,867 | 4/1968 | Daunt | 165/10 |
| 3,413,814 | 12/1968 | Van Geuns | 62/3 |
| 3,621,665 | 11/1971 | Mokadam | 62/79 |
| 3,633,373 | 1/1972 | Carbonell | 62/79 |
| 3,732,690 | 5/1973 | Meijer | 123/1 A |
| 3,750,417 | 8/1973 | Johannes et al. | 62/114 |
| 3,960,204 | 6/1976 | Horn | 165/4 |
| 4,039,023 | 8/1977 | McClaine | 165/2 |
| 4,044,819 | 8/1977 | Cottingham | 165/1 |
| 4,161,211 | 7/1979 | Duffy | 165/1 |
| 4,165,569 | 8/1979 | Mackay | 62/46.2 |
| 4,178,987 | 12/1979 | Bowman et al. | 165/1 |
| 4,188,795 | 2/1980 | Terry | 62/102 |
| 4,200,144 | 4/1980 | Sirovich | 165/1 |
| 4,214,699 | 7/1980 | Buchner et al. | 62/46.2 |
| 4,222,770 | 9/1980 | Osumi et al. | 75/122 |
| 4,249,940 | 2/1981 | Sanorock et al. | 75/122 |
| 4,270,360 | 6/1981 | Nakane et al. | 62/46.2 |
| 4,292,265 | 9/1981 | Ron et al. | 264/82 |
| 4,347,082 | 8/1982 | Osumi et al. | 75/171 |
| 4,372,376 | 2/1983 | Nelson et al. | 165/104 |
| 4,409,799 | 10/1983 | Nishizaki et al. | 62/467 R |
| 4,422,500 | 12/1983 | Nishizaki et al. | 165/104.12 |
| 4,436,539 | 3/1984 | Ron et al. | 62/4 |
| 4,487,253 | 12/1984 | Malek et al. | 165/11 R |
| 4,489,553 | 12/1984 | Wheatley et al. | 60/516 |
| 4,523,635 | 6/1985 | Nishizaki et al. | 165/104.12 |
| 4,723,595 | 2/1988 | Yasunaga | 62/46.2 |
| 4,819,717 | 4/1989 | Ishikawa et al. | 62/46.2 |
| 4,819,718 | 4/1989 | Ishikawa et al. | 62/46.2 |

*Primary Examiner*—Ronald C. Capossela
*Attorney, Agent, or Firm*—Gifford, Groh, Sprinkle, Patmore and Anderson

[57] ABSTRACT

A heat pump utilizing beds of hydride forming materials for absorption and desorption of hydrogen as a working fluid in a sealed system. A bed structure including alternate layers of heat conducting discs and powdered hydride former is disclosed, and the incorporation of the beds into a liquid type heat exchanger-reaction vessel is also set forth.

24 Claims, 3 Drawing Sheets

HYDROGEN HEAT PUMP

BACKGROUND OF THE INVENTION

1. Field of the Invention

This invention relates to a heat pump, and, more particularly, to a heat pump suitable for air conditioning vehicles utilizing beds of hydride forming materials for absorption and desorption of hydrogen as the working fluid of the system.

2. Description of the Prior Art

There has been an increased emphasis on the elimination of freon as the working fluid for air conditioning systems because of the contamination of the earth's atmosphere by escaping freon. This has led to the search for other refrigerants and to the investigation of improved air conditioning systems. The continuing energy crisis has also led to the search for the better use of fuels with minimization of waste and pollution. These factors have led, directly or indirectly, to efforts in developing a heat pump utilizing hydrogen as the working medium. Likewise, specific efforts have been directed to the development of a hydrogen heat pump for vehicle air conditioning, and this is the specific area to which the present invention is directed, although it will be apparent that the invention has application to hydrogen heat pumps in general, both for heating and cooling.

Unlike conventional air conditioners, which are powered by mechanical or electrical energy to drive the expansion of freon gas, the hydrogen heat pump is a chemical heat pump utilizing the heat of reversible reaction of hydrogen gas with selected intermetallic compounds. These hydrogen absorbing materials are usually referred to as metal hydrides, although the materials themselves are metal hydride forming materials. It has been known for a long time that the safest way of storing large quantities of hydrogen gas is with the use of these metal hydrides.

It is also well known that these materials include certain metals and intermetallic compounds which form metal hydrides when they are exposed to hydrogen gas under appropriate temperature and pressure conditions. The chemical equation describing this reaction is:

$$M + (x/2)H_2 \rightleftharpoons MH_x$$

where M is the hydride forming material. The absorbing material breaks up into fine powder due to hydrogen gas penetrating and expanding the crystalline lattice of the material. The direction of the shift from equilibrium between the material and hydrogen is determined by the thermodynamics of the reaction, i.e., the temperature and gas pressure determine whether absorption or dEsorption takes place. By selecting a pair of different hydride forming materials, one more stable to hydride formation than the other, a system can be developed to absorb and desorb hydrogen from one hydride forming bed to another by thermally cycling one of the two beds. The hydride beds can be incorporated into heat exchange or reaction vessels to constitute the evaporator and condenser components of the heat pump air conditioning system.

The development of a hydrogen heat pump for use in air conditioning vehicles has been implemented by the development of such a system for air conditioning a bus, as set forth in U.S. Pat. No. 4,436,539 to Moshe Ron et al. One of the primary problems is the appropriate selection or development of a higher temperature, more stable hydride forming material and a compatible lower temperature, less stable hydride forming material. For example, it is readily apparent that the two materials must be chosen so that the desorption pressure of the lower temperature, less stable metal hydride forming material is higher than the absorption pressure of the higher temperature, more stable metal hydride forming material, and that the desorption pressure of the higher temperature, more stable metal hydride forming material is higher than the absorption pressure of the lower temperature, less stable metal hydride forming material at the temperatures to which the materials are exposed in accomplishing the desired degree of cooling with the available waste heat regenerating temperature. This patent application is directed in part to the development of new metal hydride forming materials for solving this problem in an economically feasible fashion.

A second equally important problem is the construction of a bed of a hydride forming material which will have a high enough heat transfer rate and will have sufficient physical stability to be economically feasible for use in a vehicular environment. Since the beds of hydride material must be thermally cycled in use, and the hydride is normally in the form of fine powder having a very low thermal conductivity, the heat exchanger design is extremely critical and must provide intimate contact with the material and the means to conduct heat to and from the bed to the external heat transfer mediums being used. The problem is further compounded by the fact that the absorbing or hydrogenation process itself tends to break down the already fine material into even finer particles, due to the expansion of the hydrogen in the crystalline lattice of the material. The fine material tends to cause plugging of filters being used to confine the material with a corresponding increase in pressure drop and reduction in hydrogen flow. The solution to this problem offered in the aforementioned Ron et al. U.S. Pat. No. 4,436,539, is to compact the hydride material with a finely divided matrix metal powder which is deformable into a porous body structure, with the intimate contact of the powder metal offering a sufficiently high heat transfer rate to a confining vessel. The process of preparing such a compact of finely divided metal having a high heat transfer rate and the metal hydride powder is set forth in U.S. Pat. No. 4,292,265 to Moshe Ron et al. Unfortunately, these hydride compact pellets are not commercially viable since they break down by spalling in something less than fifteen absorption/desorption cycles, as stated by the examples cited in U.S. Pat. No. 4,292,265. The present invention is directed to the solution of this problem of providing a high enough heat transfer rate and a long enough physical stability to make the bed economically feasible.

SUMMARY OF THE INVENTION

The foregoing improvements and other advantages of the invention have been embodied in a bed of hydride forming material for particular use in a heat pump, which is operated by transferring hydrogen between two reaction vessels. Each of the vessels employs at least one bed, the bed or beds of one reaction vessel containing a higher temperature, more stable metal hydride forming material. The bed or beds in the other of the two reaction vessels contains a lower temperature, less stable metal hydride forming material.

Each of the beds include a heat conducting metal tube which is closed at one end and open at its other end. A plurality of heat conducting metal discs are used, each disc having an outer periphery conforming to the inside diameter of the tube. Both the tube and the discs are preferably made from aluminum or copper or alloys thereof having a high thermal conductivity. Each bed also has a plurality of layers of powdered metal hydride forming material. The metal discs are pressed into the tube with alternate layers of powdered metal hydride forming material sandwiched between adjacent discs. Finally, a filter is inserted into the open end of the tube to prevent the escape of metal hydride forming material, while permitting the flow of hydrogen gas into and out of the open end of the tube for absorption and desorption of the hydrogen by the layers of metal hydride forming material.

Preferably, the tubes are cylindrical or have a square cross-section with the discs having a conforming circular or square configuration. The discs have a slightly larger diameter than the inside diameter of the tube to assure good thermal contact between the discs and the tubes as the discs are pressed into the tube. Preferably, the discs are also notched at their peripheries to allow the transport of hydrogen gas to the layers of powdered metal hydride forming material throughout the bed, and also to facilitate the pressing of the discs into the tube. In addition, the discs may also contain ⅛ inch diameter holes in their centers to facilitate hydrogen gas flow.

In order to provide an economical heat pump package, the weight of powdered hydride forming material in each bed is preferably at least 80% of the total weight of the layers of powdered metal hydride forming material and the weight of the metal discs. This objective is accomplished by providing discs having a thickness between 0.004 and 0.020 inches, with the layers of powdered metal hydride forming material having a thickness between 0.020 and 0.080 inches. Nominally, the discs can have a thickness of approximately 0.01 inches, and the layers of powdered metal hydride forming material can have a thickness of approximately 0.04 inches. Tubes with inside diameters of 1 to 1¼ inches and lengths between four and sixteen inches are preferable.

The filter is preferably a ceramic filter disc which has pores large enough to allow free passage of the hydrogen gas but small enough to prevent the passage of the powdered metal hydride forming material.

The method of forming the bed of hydride forming material includes the step of providing a slurry of metal hydride forming powder material suspended in an inert organic solvent, which prevents oxidation of the material by atmospheric oxygen and water and allows assembly of the bed. Alternately, a heat conducting metal disc is pressed into the open end of the metal tube and a layer of slurry is introduced into the tube on top of the preceding disc until the tube is filled with alternate layers of discs and powdered slurry. The filter disc is introduced into the open end of the tube and the solvent is evacuated from the tube.

Preferably, the solvent used in the step to form the slurry is a small chain alkane from the group of pentane, hexane, heptane and octane.

The metal hydride forming material is powdered for this step by hydriding the virgin material or by ballmilling it in the solvent used to form the slurry.

An additional step in forming the bed may also be used after evacuation to reactivate the metal hydride forming material by heating in a hydrogen atmosphere. Preferably, this is accomplished at a pressure of 2-3 atmospheres and a temperature of 250 to 400 degrees C. for 4-5 hours.

A heat pump utilizing the beds of this invention is constructed with a first reaction vessel having a plurality of the beds containing a plurality of layers of a higher temperature, more stable metal hydride forming material, with the open ends of the tubes being connected to a manifold. A second reaction vessel is constructed with a plurality of the beds each containing layers of a lower temperature, less stable metal hydride forming material, with the open ends of the tubes being connected to a manifold. A fixed quantity of hydrogen is introduced into one of the reaction vessels, and the two manifolds are connected together so that hydrogen can pass between the first and second reaction vessels for absorption and desorption by the higher temperature, more stable metal hydride forming material in the first reaction vessel, and absorption and desorption by the lower temperature, less stable material in the second reaction vessel.

First and second heat exchangers are provided for supplying heat to and withdrawing heat from the first reaction vessel, and third and fourth heat exchangers are supplied for withdrawing and supplying heat to the second reaction vessel. Suitable control means operates in a predetermined sequence, so that the hydrogen is absorbed and desorbed in both vessels and proper heat transfer is provided by the heat exchangers, with the hydrogen gas flowing between the first and second reaction vessels.

Third and fourth pressure vessels identical to the first and second pressure vessels are provided so that the first and second vessels will operate in a selected heating or cooling air conditioning mode, while the third and fourth pressure vessels will operate in a regeneration mode and thereafter the control will shift the system so that the third and fourth pressure vessels will operate in the selected heating or cooling air conditioning mode, while the first and second pressure vessels will be operating in a regeneration mode. This 180 degree out-of-phase operation of the two pairs of pressure vessels will supply continuous air conditioning and regeneration.

When the heat pump is operated as an air conditioning system for a vehicle, the pair of pressure vessels operating in the regeneration mode will have a first heat exchanger supplying heat from vehicle exhaust to the pressure vessel having the higher temperature, more stable hydride forming material so that hydrogen will be desorbed from its beds to flow to the pressure vessel having the lower temperature, less stable hydride forming material, which will absorb the hydrogen as heat is being transferred from that pressure vessel to ambient via the third heat exchanger. At the same time, the pair of pressure vessels operating in the air conditioning mode will have the pressure vessel with beds containing the lower temperature, less stable hydride forming material desorb hydrogen gas as the material is being heated by a fourth heat exchanger as it withdraws heat from the vehicle space being cooled. The gas is then transferred to the reaction vessel containing the higher temperature, more stable hydride forming material for absorption by this material as it is being cooled by a second heat exchanger transferring heat to ambient.

The new metal hydride forming materials of this invention are set forth in the Detailed Description of the Preferred Embodiment of the Invention.

The foregoing features and advantages and others will become more apparent from the following description and the accompanying drawing.

DETAILED DESCRIPTION OF THE PREFERRED EMBODIMENTS OF THE INVENTION

Figure 1:
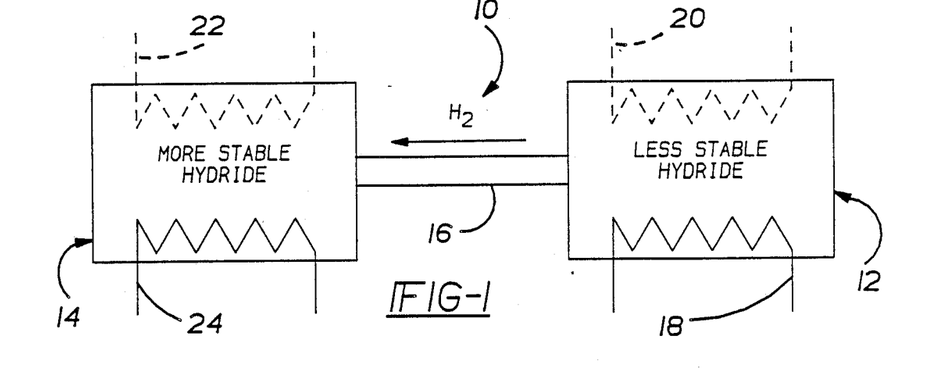
FIG. 1 is a schematic view of the heat pump of this invention, showing its operation in an air conditioning mode with heat being delivered from the vehicle space being cooled to the less stable metal hydride in a reaction vessel as hydrogen is desorbed and transferred to a reaction vessel containing the more stable hydride, which is being cooled by heat transfer to ambient where the hydrogen is absorbed by the more stable hydride.
Figure 2:
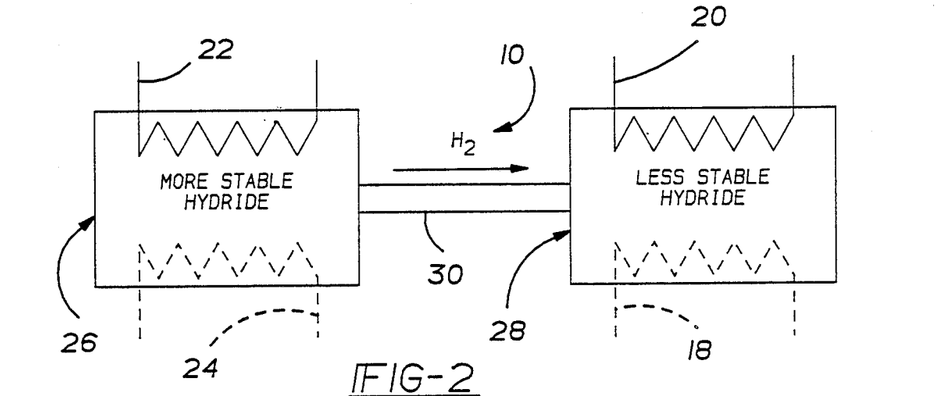
FIG. 2 is a schematic view of the heat pump of this invention, showing its operation in a regeneration mode with heat being delivered from engine exhaust heat to the more stable metal hydride in a reaction vessel as hydrogen is desorbed and is transferred to the reaction vessel containing the less stable hydride, which is being cooled by heat transfer to ambient.

Referring to FIGS. 1 and 2, the heat pump 10 of this invention includes a reaction vessel 12 containing a lower temperature, less stable metal hydride, and a reaction vessel 14 containing a higher temperature, more stable metal hydride. The two vessels 12 and 14 are interconnected by a conduit 16 to convey hydrogen between the two vessels in a closed sealed system. The pressure vessel 12 is alternately heated and cooled by heat exchangers shown schematically as heat exchangers 18 and 20, and reaction vessel 14 is heated and cooled by heat exchangers 22 and 24.

In FIG. 1, the heat pump 10 is operating in the air conditioning mode, with the heat exchanger 18 providing 10-15 degrees centigrade cooling to the passenger compartment of the vehicle, and this heat is introduced into the less stable hydride forming material so that hydrogen is desorbed and transmitted to the reaction vessel 14 containing the higher temperature, more stable hydride forming material, which absorbs the hydrogen as the heat exchanger 24 cools the hydride by heat exchange at ambient temperature.

At the same time that the reaction vessels 12 and 14 are operating in an air conditioning mode, identical reaction vessels 26 and 28 interconnected with hydrogen conduit 30 are operating in a regeneration mode as shown in FIG. 2. Here, heat is supplied by heat exchanger 22, which obtains heat from the engine exhaust at 140 degrees C. to heat the higher temperature, more stable hydride forming material to desorb the hydrogen for delivery to the lower temperature, less stable hydride in reaction vessel 28 by way of conduit 30. The less stable hydride forming material absorbs the hydrogen as it is being cooled by ambient heat exchanger 20. Thus, reaction vessels 12 and 14 operate 180 degrees out of phase with reaction vessels 26 and 28.

When absorption of the hydrogen is complete in the more stable hydride forming vessel 14 during the air conditioning cycle depicted in FIG. 1, reaction vessels 12 and 14 will be operated in a regeneration mode, while reaction vessels 26 and 28 will be operated in an air conditioning mode.

Figures 3, 4:
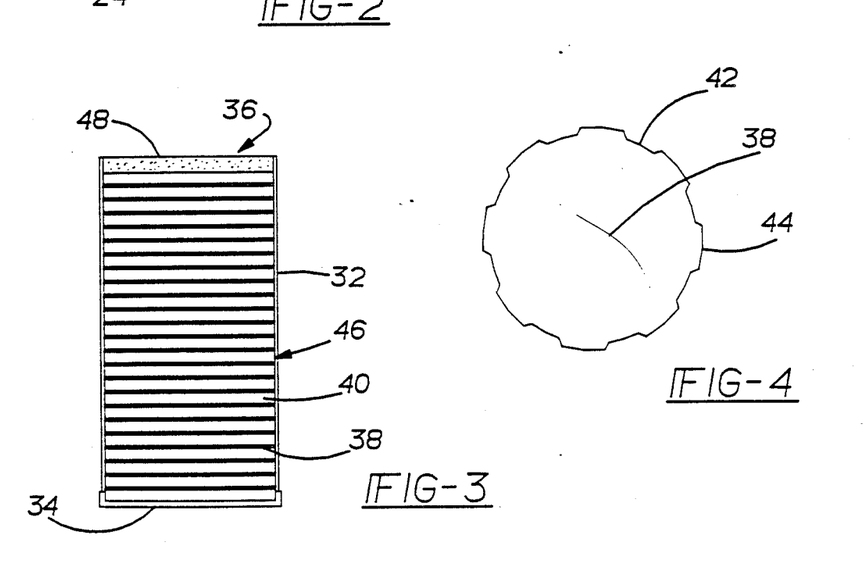
FIG. 3 is an elevational view in section, showing a metal hydride bed constructed according to the teachings of this invention including a heat conducting metal tube of copper or aluminum closed at one end and open at the other end, and having alternate layers of heat conducting metal discs of aluminum or copper and layers of powdered metal hydride forming material.
FIG. 4 is a plan view of a preferred form of the metal discs used in the bed construction of FIG. 3.

Beds of hydride material used in the reaction vessels are constructed in the manner shown in FIG. 3. Heat conducting tube 32 is closed at one end 34 and open at the other end 36. These tubes are preferably made of aluminum or copper, and are from four to sixteen inches long with an internal diameter of 1 to 1¼ inches. Alternate layers of heat conducting discs 38 and hydride forming material 40 are arranged in the tube. Each disc 38 has a diameter conforming to or slightly larger than the inside diameter of the tube so as to have intimate contact with the tube as it is deformed in pressing the disc into the tube.

FIG. 4 shows that the outer periphery of the disc is notched to provide alternate channels 42 and projections 44. The outside diameter of disc 38 preferably has an outside diameter of approximately 0.010 inches larger than the inside diameter of tube 32, so that the projections 44 will be bent upward slightly as the disc is pressed into the tube leaving passageways 42 for the permeation of hydrogen throughout the length of the bed.

The hydride forming material is introduced into the tube in alternate layers by suspending the material in an inert organic solvent such as a low molecular weight alkane. Pentane, hexane, heptane and octane alkanes all are equally suited for this purpose. Other inert organic liquids such as benzene, toluene and cycloalkanes can also be used.

The thickness of the heat conducting aluminum or copper discs is from 0.004 to 0.020 inches The thickness of the powdered metal hydride forming material is between 0.020 and 0.080 inches. We have found that economical cycle times of three minutes or less can be obtained with the use of 0.010 inch aluminum discs and a metal hydride powder layer of 0.040 inches; 80% of the metal hydride forming material's hydrogen capacity can be absorbed or desorbed in a three minute cycle time.

Construction of the hydride bed 46 is completed by inserting a filter disc 48 into the open end 36 of tube 32. This filter has pores which are small enough to prevent the passage of powdered metal hydride forming material, but large enough to pass the hydrogen gas. After construction is complete, the solvent carrier is evacuated from the tube.

An additional step in forming the bed may also be desirable depending on the time span used to construct the beds. This additional step would be performed after evacuation to reactivate the metal hydride forming material by heating in a hydrogen atmosphere. Preferably, this is accomplished at a pressure of 2-3 atmo- spheres and a temperature of 250 to 400 degrees C. for 4-5 hours.

Figure 5:
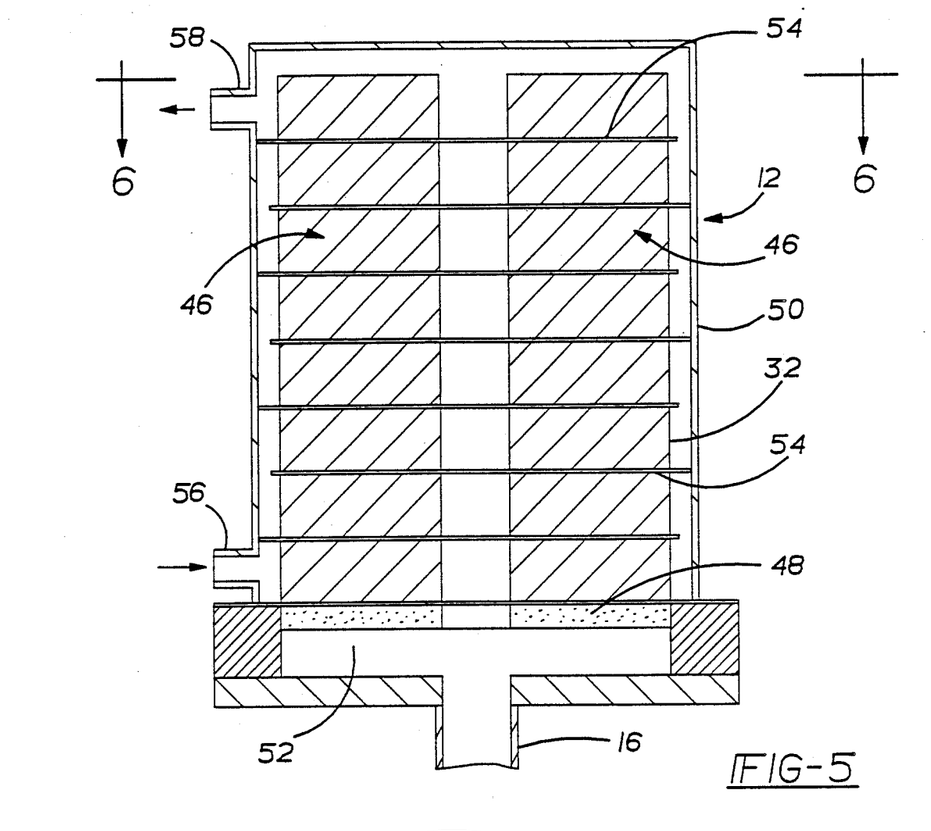
FIG. 5 is an elevational sectional view of a cylindrical reaction vessel which contains four beds made according to FIG. 3 and heat transfer to and from the beds by a liquid heat transfer medium.
Figure 6:
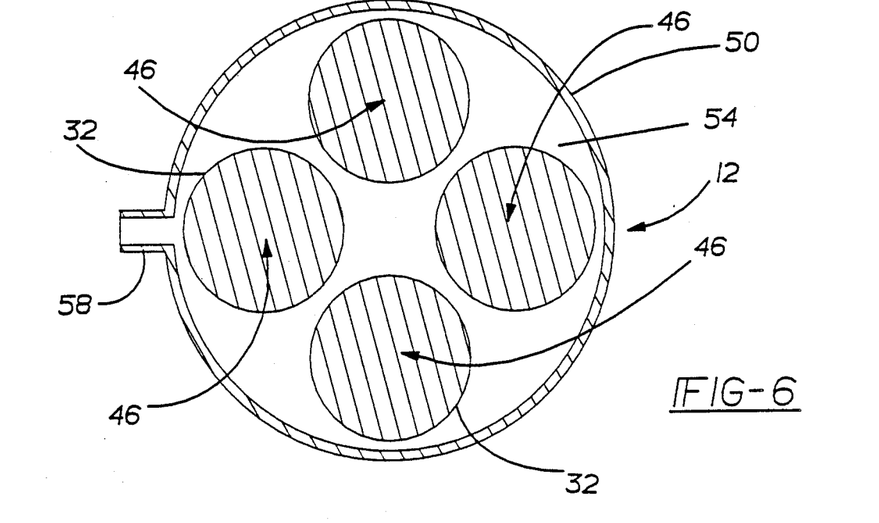
FIG. 6 is a cross-sectional view taken along line 6—6 in FIG. 5.

The hydride beds 46 are assembled into a reaction vessel 12 in order to absorb and desorb hydrogen gas and produce the useful heating or cooling and additional heat transfer including the regeneration of the beds. FIGS. 5 and 6 show a cylindrical reaction vessel 50 which contains four hydride beds 46 having a common hydrogen gas manifold 52 connected to the beds 46 at their open ends 36 containing the ceramic filter disc 48. The hydrogen conduit 16 is connected to this common manifold for conveying the hydrogen gas to a like reaction vessel 14, in the form of a cylindrical vessel 50 to complete the operating pair.

The tubes 32 of the hydride beds 46 are assembled in a tube bundle with heat conducting fins serving to connect the tubes together as well as serving to transfer heat between the beds and the heat transfer liquid being used. The heat transfer liquid is circulated through the reaction vessel 50 from an inlet 56 at the bottom of the vessel to an outlet 58 at the top of the vessel. The heat exchange liquid for the higher temperature, more stable hydride bed containing vessels can be a silicon oil to provide proper heat transfer and stability under the higher operating temperatures of 140 degrees C. as it is heated by exhaust gas from the vehicle. The liquid in the lower temperature, less stable hydride bed reaction vessels can be a glycol or a glycol/water mixture commonly used in the cooling systems of motor vehicles.

Figure 7:
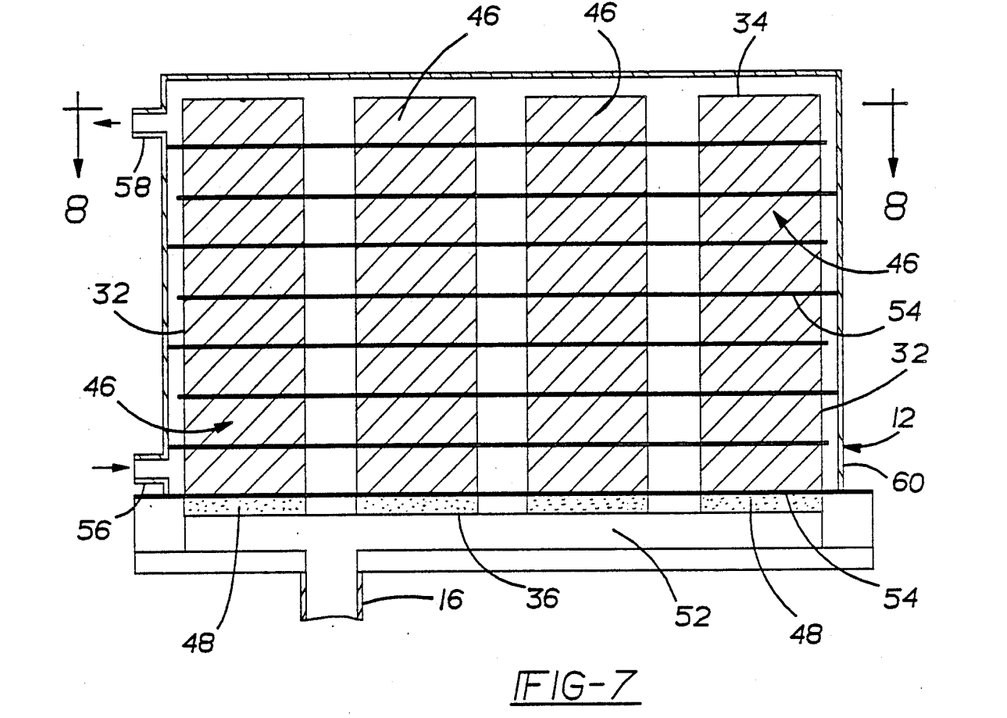
FIG. 7 is a sectional elevational view of an alternate rectangular form of reaction vessel.
Figure 8:
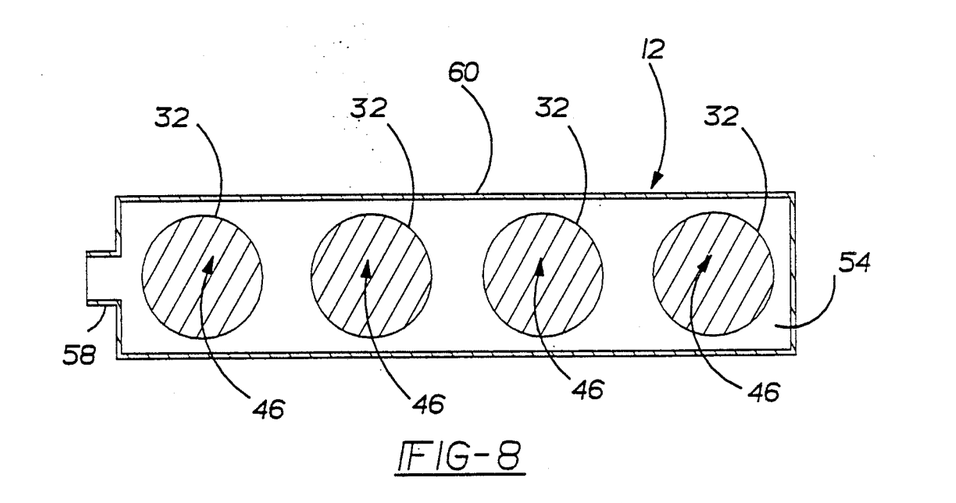
FIG. 8 is a cross-sectional view of the reaction vessel of FIG. 7 taken along 8—8 in FIG. 7.

An alternative reaction vessel structure is shown in FIGS. 7 and 8, wherein the tubes 32 of the hydride beds 46 are arranged in a single row in rectangular casing 60 of the reaction vessel. Like the reaction vessel 50 of FIGS. 5 and 6, the hydride bed tubes 32 are held together by heat transfer fins 54. Four reaction vessels are necessary to provide the two operating pairs; one pair operating in an air conditioning mode and the other pair simultaneously operating in a regeneration mode. It appears that the rectangular vessel design will normally be more suited for passenger vehicle use. The hydride bed tubes can also have a square cross-section for improved space utilization.

The specific hydride forming materials for both the lower temperature, less stable and the higher temperature, more stable hydride formers are intermetallic compositions or alloys having a significant portion of a cerium free mischmetal with the lower temperature, less stable hydride former also containing a lesser percentage of mischmetal. A mischmetal, Mm, is a reduced rare earth metal having cerium, lanthanum, neodymium and praseodymium in a typical weight ratio of 45:35:15:5 respectively. A cerium free mischmetal, CfMm, will have the same ratio of lanthanum, neodymium and praseodymium without cerium. The lower temperature, less stable hydride forming material has the general formula:

$CfMm_{0.70-0.90}Mm_{0.10-0.30}Ni_5$

The general formula for the higher temperature, more stable hydride forming material is as follows:

$CfMm_{1.00-1.40}La_{0.00-0.30}Al_{0.05-0.20}Fe_{0.05-0.85}Ni_{4.75}$

It should be understood that while the mischmetal and cerium free mischmetal are refined from ores of the same, that they may be alloyed directly utilizing the mischmetal or cerium free mischmetal rare earth elements as separate components. For example, the following composition was formulated by alloying the metals lanthanum, neodymium, praseodymium, aluminum, manganese and iron in the following formula which falls within the general formulation above:

$La_{0.649}Nd_{0.266}Pr_{0.085}Ni_{4.75}Al_{0.1}Mn_{0.1}Fe_{0.05}$

The following high temperature, more stable alloy refined from a cerium free mischmetal has been refined from a cerium free mischmetal:

$CfMm_{0.7}La_{0.3}Ni_{4.75}Al_{0.15}Mn_{0.15}$

A typical low temperature, less stable alloy has the following composition $CFMn_{0.85}Mm_{0.15}Ni_5$ being refined from a cerium-free mischmetal and mischmetal ore. Both of the more stable and less stable compositions have a working capacity of between 3.5 to 4.5 moles H per mole of alloy. The desorption plateau pressures are 2.5 to 3.5 atmospheres for the more stable material, and 12.5 to 13.5 atmospheres for the less stable material. The absorption plateau pressures are 3.5 to 4.5 atmospheres for the more stable material, and 23 to 25 atmospheres for the less stable material. These pressures were measured at 40 degrees C. for the less stable material and 50 degrees C. for the more stable material. The more stable material will absorb and desorb 80% of its working capacity in as little as 1.5 minutes at 40-50 degrees C. with a 1.5 atmosphere pressure head. The less stable material takes closer to 3 minutes for absorption and desorption. In any event, the cycle can be based on a three minute air conditioning and a three minute regeneration cycle.

With the use of the lower temperature, less stable metal hydride forming material and the higher temperature, more stable metal hydride forming material set forth above in a bed configuration utilizing a 1¼" I.D. aluminum tube, approximately 12" long filled with alternate layers of 0.010" thick aluminum discs and 0.040" layers of the hydride powder, and with the use of 140 degree C. vehicle exhaust heat for desorbing the higher temperature hydride, each of the four reaction vessels can be configured with four beds to provide 1 to 1½KW of cooling. With an aluminum structure the total weight of the system will be less than 50 pounds. With the modular bed design, capacity can be easily tailored by the addition or deletion of beds. It has also been found that there will be less than a 25% loss in hydrogen working capacity after 10,000 cycles which is more than adequate for a vehicular air conditioning unit.

We claim:

1. A bed of hydride forming material for use in a heat pump, operating by transferring hydrogen between two reaction vessels, each vessel employing at least one bed, said bed containing a higher temperature more stable metal hydride forming material in one reaction vessel, and said bed containing a lower temperature less stable metal hydride forming material in the other reaction vessel, each of said beds comprising:

a heat conducting metal tube closed at one end and open at its other end;
   a plurality of heat conducting metal discs having an outer periphery conforming to the inside diameter of said tube;
   a plurality of layers of powdered metal hydride forming material;

said metal discs being pressed into said tube with alternate layers of powdered metal hydride forming material sandwiched between the discs;

said bed allowing the flow of hydrogen gas into and out of the open end of said tube for absorption and desorption of gas by the layers of metal hydride forming material.

2. The bed according to claim 1 wherein said tube is cylindrical and said metal discs are circular.

3. The bed according to claim 2 wherein said discs have a slightly larger diameter than the inside diameter of said tube, assuring a good thermal contact between said discs and said tube as said discs are pressed into said tube.

4. The bed according to claim 3 wherein said metal discs are notched at their peripheries to allow transport of hydrogen gas to said layers of powdered metal hydride forming material throughout the bed and to facilitate pressing the discs into the tube.

5. The bed according to claim 1 wherein said tube and discs are made with aluminum or copper.

6. The bed according to claim 5 wherein the weight of the powdered metal hydride forming material in said tube is at least 80% of the total weight of said layers of powdered metal hydride forming material and the weight of said metal discs.

7. The bed according to claim 1 wherein said tube is between four and sixteen inches long and is filled alternately with metal discs and layers of metal hydride forming material from said closed end to adjacent said open end.

8. The bed according to claim 7 wherein said tube is cylindrical and said discs are circular, and the inside diameter of said tube is between one and one and one quarter inches.

9. The bed according to claim 8 wherein said discs have a diameter 0.010 inches larger than the inside diameter of said tube.

10. The bed according to claim 8 wherein said discs have a thickness between 0.004 and 0.020 inches.

11. The bed according to claim 10 wherein the thickness of said layers of powdered metal hydride forming material is between 0.020 and 0.080 inches.

12. The bed according to claim 9 wherein said discs are aluminum having a thickness of approximately 0.01 inches and said layers of powdered metal hydride forming material have a thickness of approximately 0.04 inches.

13. The bed according to claim 1 further including filter means at the open end of said tube for preventing the escape of metal hydride forming material while permitting the flow of hydrogen gas.

14. The bed according to claim 13 wherein said filter means includes a ceramic filter disc having pores large enough to allow free passage of hydrogen gas but small enough to prevent the passage of said powdered metal hydride forming material.

15. The bed according to claim 1 wherein said powdered metal hydride material has the composition $$CfMm_{0.70-0.90}Mm_{0.10-0.30}Ni_5$$

wherein Mm is a mischmetal and CfMm is a cerium free mischmetal.

16. The bed according to claim 1 wherein said powdered metal hydride material has the composition $$CfMm_{1.00-1.40}La_{0.00-0.30}Ni_{4.75}$$
$$Al_{0.05-0.20}Mn_{0.050} \cdot Fe_{0.05-0.85}$$

wherein CfMm is a cerium free mischmetal.

17. A heat pump comprising:
a first reaction vessel having a plurality of beds according to claim 1, each bed containing a plurality of layers of a higher temperature more stable metal hydride forming material, the open ends of the tubes forming said beds being connected to a first manifold;

a second reaction vessel having a plurality of beds according to claim 1, each bed containing a plurality of layers of a lower temperature less stable metal hydride forming material, the open ends of the tubes forming said beds being connected to a second manifold;

a fixed quantity of hydrogen contained within at least one of said reaction vessels in said respective beds and manifold; and means connecting said first and second manifolds for passing hydrogen between said first and second reaction vessels for absorption and desorption by the higher temperature more stable metal hydride forming material in said first reaction vessel and absorption and desorption by the lower temperature less stable metal hydride forming material in said second reaction vessel.

18. The heat pump according to claim 17 further including:
a first heat exchanger for supplying heat to said first reaction vessel;

a second heat exchanger for withdrawing heat from said first reaction vessel;

a third heat exchanger for withdrawing heat from said second reaction vessel;

a fourth heat exchanger for supplying heat to said second reaction vessel; and control means for predetermined operation of said heat exchangers and hydrogen flow in the following control steps:
  (a) hydrogen is desorbed by the higher temperature more stable metal hydride forming material in said first reaction vessel while said first heat exchanger is operational;
  (b) said hydrogen is caused to flow to said second reaction vessel;
  (c) the hydrogen is absorbed by said lower temperature less stable metal hydride forming material in said second vessel while said third heat exchanger is operational;
  (d) the hydrogen is desorbed by the lower temperature less stable metal hydride forming material in said second vessel while said fourth heat exchanger is operational; and
  (e) said hydrogen is caused to flow to said first reaction vessel where it is absorbed by said higher temperature more stable metal hydride forming material in said first vessel while said second heat exchanger is operational.

19. The heat pump according to claim 18 wherein liquid is used as a heat transfer medium in said first, second, third and fourth heat exchangers to transfer heat to and from said first reaction vessel and said second reaction vessel.

20. The heat pump according to claim 18 operated as an air conditioning system for a vehicle wherein:
said first heat exchanger supplies heat to said first reaction vessel from a source of waste heat from said vehicle;

said second heat exchanger transfers heat from said first reaction vessel to ambient;

said third heat exchanger transfers heat from said second reaction vessel to ambient; and said fourth heat exchanger withdraws heat from a vehicle space to be cooled and supplies it to said second reaction vessel.

21. The heat pump according to claim 20 wherein a silicone oil is used in said first and second heat exchangers to transfer heat to and from said first reaction vessel, and a glycol-water mixture is used in said third and fourth heat exchangers to transfer heat to and from said second reaction vessel.

22. The heat pump according to claim 20 wherein the lower temperature, less stable metal hydride forming material in said second vessel has the following composition:

$$CfMm_{0.70-0.90}Mm_{0.10-0.30}Ni_5$$

and the higher temperature, more stable metal hydride forming material in said first vessel has the following composition:

$$CfMm_{1.00-1.40}La_{0.00-0.30}Ni_{4.75}Al_{0.05-0.20}Mn_{0.05-0.20}Fe_{0.05-0.85}$$

wherein Mm is a mischmetal and CfMm is a cerium free mischmetal.

23. The heat pump according to claim 20 further including third and fourth reaction vessels identical to said first and second reaction vessels respectively, said third and fourth reaction vessels having a fixed quantity of hydrogen and being connected to first and second manifolds and having like first, second, third and fourth heat exchangers with control means, so that as said heat pump is being operated as an air conditioning system for a vehicle, said control means causes:

said first and second reaction vessels to function in a regeneration mode wherein control steps (a), (b) and (c) are performed with hydrogen being desorbed in the first reaction vessel while heat is being supplied by a first heat exchanger from the source of waste heat, hydroqen flows to the second reaction vessel where it is absorbed while heat is being transferred to ambient by a third exchanger;

and simultaneously therewith said control means causes:

said third and fourth reaction vessels to function in a cooling air conditioning mode while control steps (d) and (e) are performed, with hydrogen being desorbed in said fourth reaction vessel while heat is being supplied by a fourth heat exchanger from the vehicle space being cooled, hydrogen flows to the third reaction vessel where it is absorbed while heat is being transferred to ambient by a second heat exchanger; and thereafter said control means causes said first and second reaction vessels to function in a cooling air conditioning mode while said third and fourth reaction vessels simultaneously function in a regenerative mode as aforesaid.

24. The heat pump according to claim 23 wherein the hydride forming material in the beds of each of the first, second, third and fourth reactions vessels absorbs 80% of its working capacity of hydrogen in three minutes or less and that it also desorbs 80% of its working capacity in three minutes or less.

* * * * *

UNITED STATES PATENT AND TRADEMARK OFFICE
CERTIFICATE OF CORRECTION

PATENT NO. : 4,928,496

DATED : May 29, 1990

INVENTOR(S) : W. Edward Wallace; H. Kevin Smith; W. Bryan Lynch; Raymond S. Craig; Elagz Pourarian It is certified that error appears in the above-identified patent and that said Letters Patent is hereby corrected as shown below:

On the title page, item [73]
Under Assignee:

Delete " Advanced Materials Corporation, Pittsburg, Pa." and
    insert -- Advanced Materials Corporation
        Pittsburg, Pa.   and Master Chemical Corporation
        Perrysburg, Ohio --, (part interest)

Signed and Sealed this

Fourteenth Day of January, 1992

*Attest:*

HARRY F. MANBECK, JR.

*Attesting Officer*     *Commissioner of Patents and Trademarks*